(12) United States Patent
Kim et al.

(10) Patent No.: US 11,872,705 B2
(45) Date of Patent: Jan. 16, 2024

(54) AUTONOMOUS MOBILE ROBOT UTILIZING AN OMNI-DIRECTIONAL WAYPOINT AND CONTROL METHOD THEREOF

(71) Applicants: Hyundai Motor Company, Seoul (KR); Kia Corporation, Seoul (KR)

(72) Inventors: Joohan Kim, Suwon-si (KR); Kyeun Ahn, Hwaseong-si (KR); Youngjin Jung, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 260 days.

(21) Appl. No.: 17/475,597

(22) Filed: Sep. 15, 2021

(65) Prior Publication Data
US 2022/0161432 A1 May 26, 2022

(30) Foreign Application Priority Data

Nov. 24, 2020 (KR) .................. 10-2020-0158778

(51) Int. Cl.
 *B25J 9/16* (2006.01)
(52) U.S. Cl.
 CPC .......... *B25J 9/1666* (2013.01); *B25J 9/1633* (2013.01)
(58) Field of Classification Search
 CPC ........ B25J 9/1666; B25J 9/1633; B25J 9/161; B25J 9/1664; B25J 9/1674; G05D 2201/0216; G05D 1/0238; G05D 1/0236; G05D 1/0212; G05D 1/0282; G05B 19/409; G06F 3/0484
 See application file for complete search history.

(56) References Cited

U.S. PATENT DOCUMENTS

| | | | |
|---|---|---|---|
| 6,097,996 A * | 8/2000 | Deker ................. | G05D 1/0202 701/3 |
| 7,587,260 B2 | 9/2009 | Bruemmer et al. | |
| 9,632,504 B1 * | 4/2017 | Watts .................. | G05D 1/0231 |

(Continued)

FOREIGN PATENT DOCUMENTS

| CN | 103399575 A | * 11/2013 |
|---|---|---|
| KR | 10-2019-0143524 A | 12/2019 |

*Primary Examiner* — Khoi H Tran
*Assistant Examiner* — Nhi Q Bui
(74) *Attorney, Agent, or Firm* — MORGAN, LEWIS & BOCKIUS LLP (57) ABSTRACT

An autonomous mobile robot (AMR) for transferring a component part in a process line of a production factory may include, a sensor unit configured to detect an obstacle in a travel path, an interface unit configured to identify coordinates of a waypoint and set an accuracy zone having a circular area around the waypoint, an omni-directional waypoint generation unit configured to obtain the travel path in a curved line which is aligned to tangentially meet a tangent vector of the circular area, a driving unit configured to generate a driving torque for driving the AMR, and a controller electrically connected to the sensor unit, the interface unit, the omni-directional waypoint generation unit and the driving unit and configured to control the driving unit to move the AMR along the travel path toward the waypoint, and when a current position of the AMR enters an effective range of the accuracy zone, to move the AMR toward the destination point without further moving toward the waypoint.

19 Claims, 5 Drawing Sheets

(56) References Cited

U.S. PATENT DOCUMENTS

| | | | |
|---|---|---|---|
| 10,353,400 B2 * | 7/2019 | Chou | G05D 1/0255 |
| 2010/0198443 A1 * | 8/2010 | Yabushita | G05D 1/0274 |
| | | | 701/25 |
| 2013/0048383 A1 * | 2/2013 | Panchal | E21B 44/00 |
| | | | 175/170 |
| 2019/0220043 A1 * | 7/2019 | Zamora Esquivel | |
| | | | G05D 1/0088 |
| 2021/0064065 A1 * | 3/2021 | Chen | B64C 39/024 |
| 2021/0331315 A1 * | 10/2021 | Park | B25J 13/089 |

* cited by examiner

AUTONOMOUS MOBILE ROBOT UTILIZING AN OMNI-DIRECTIONAL WAYPOINT AND CONTROL METHOD THEREOF

CROSS-REFERENCE TO RELATED APPLICATION

The present application claims priority to Korean Patent Application No. 10-2020-0158778 filed on Nov. 24, 2020, the entire contents of which is incorporated herein for all purposes by this reference.

BACKGROUND OF THE INVENTION

Field of the Invention

The present invention relates to an autonomous mobile robot utilizing an omni-directional waypoint and a control method thereof.

Description of Related Art

In general, autonomous mobile robots (AMR) are capable of autonomous driving and are optimized for picking, so they are being provided for unmanned logistics transfer of smart factories.

For example, in the production line of a vehicle factory, various vehicle body component parts are assembled in each process, and the AMR is operated as equipment for flexible and efficient component part transfer. In such an automated production line, the interruption of component part supply during work affects the line stoppage and yield, so it is important to optimize component part transfer at the right time and in the right place.

The AMR sets a travel path from a starting point to a destination point passing through a waypoint, for transfer of component parts for each process according to the production plan.

In related art, when the AMR transfers the component portion, the direction of the waypoint is fixed only in one direction, so that the direction at the waypoint coincides with the current travel direction thereof.

Meanwhile, since the AMR operated in the factory line needs to be returned after supplying the component part, it is necessary for the AMR to move bidirectionally at the waypoint. Thus, when the directionality of the waypoint is fixed to one direction, it difficult to appropriately set the path of the AMR, causing difficulty in properly and timely transport the component part.

To pass through the waypoint according to a conventional method, traffic increase and time delay may be caused since the AMR unnecessarily takes a rotation operation at the waypoint to move to a next point.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous mobile robot for transferring a component part in a process line of a production factory, including, a sensor unit configured to detect an obstacle in a travel path of the autonomous mobile robot by monitoring surroundings, an interface unit configured to identify coordinates of a waypoint and a destination point in the travel path and set an accuracy zone having a circular area around the waypoint, an omni-directional waypoint generation unit configured to obtain the travel path in a curved line which is aligned to tangentially meet a tangent vector of the circular area, a driving unit configured to generate a driving torque for driving the autonomous mobile robot, and a controller electrically connected to the sensor unit, the interface unit, the omni-directional waypoint generation unit and the driving unit and configured to control the driving unit to move the autonomous mobile robot along the travel path toward the waypoint, and when the controller determines that a current position of the autonomous mobile robot enters an effective range of the accuracy zone, to move the autonomous mobile robot toward the destination point without further moving toward the waypoint.

The interface unit may include, a communication module configured to communicate data with surrounding process equipment and a central server configured for instructing the autonomous mobile robot, and a user interface module configured to set a travel condition upon receiving an input of the central server or a worker.

The interface unit may be configured to adjust a circle size of the accuracy zone according to a speed of the autonomous mobile robot and an available travel path curvature of the autonomous mobile robot.

The interface unit may be configured to set an initial accuracy zone having an initial size and vary the initial accuracy zone to an adjusted accuracy zone having an adjusted size depending on whether existence of the obstacle around the waypoint is changed.

When the controller determines that the obstacle is detected around the waypoint by the sensor, the interface unit may be configured to increase a size of the circular area by an increment that enables the autonomous mobile robot to avoid the obstacle, in consideration of a size or location of the obstacle positioned around the waypoint.

The omni-directional waypoint generation unit may be configured to determine a tangent vector of a boundary of the accuracy zone where the controller determines that a travel direction vector coincides the tangent vector.

The omni-directional waypoint generation unit may be configured to determine a normal vector of the boundary of the accuracy zone to determine a position of the normal vector.

The omni-directional waypoint generation unit may be configured to determine a tangent angle that indicates how close the current position of the autonomous mobile robot is to the waypoint.

The controller may be configured to move the autonomous mobile robot toward the destination point without further moving toward the waypoint when the controller determines that the tangent angle is greater than a reference angle.

The controller may be configured to drive the autonomous mobile robot based on an initial accuracy zone having an initial size and drive the autonomous mobile robot based on an adjusted accuracy zone having an adjusted size depending on detection of the obstacle at the waypoint while traveling of the autonomous mobile robot.

A control method of an autonomous mobile robot may include, identifying coordinates of a starting point, a waypoint, and a destination point, setting an accuracy zone having a circular area around the waypoint, obtaining a travel path of the autonomous mobile robot in a curved line which is aligned to tangentially meet the circular area, and driving the autonomous mobile robot along the travel path.

A control method of an autonomous mobile robot may further include, adjusting the accuracy zone to an adjusted accuracy zone having an adjusted size depending on whether existence of the obstacle around the waypoint is changed, and adjusting the travel path to an adjusted travel path according to the adjustment of the accuracy zone to the adjusted accuracy zone.

A control method of an autonomous mobile robot may further include, determining whether a current position of the autonomous mobile robot is within an effective range of the accuracy zone, and driving the autonomous mobile robot toward the destination point without further moving toward the waypoint when the controller determines that the current position of the autonomous mobile robot is within the effective range of the accuracy zone.

In the setting of the accuracy zone, a tangent vector of a boundary of the accuracy zone may be calculated. In the obtaining of the travel path, the travel path may be obtained in the curved line so that a travel direction vector on the travel path coincides the tangent vector. In the determining of whether a current position of the autonomous mobile robot is within an effective range of the accuracy zone, it may be determined that the current position is within the effective range of the accuracy zone when a tangent angle is greater than a reference angle, where the tangent angle is calculated as an angle between an imaginary line interconnecting the starting point and the waypoint and an imaginary line interconnecting the current position of the autonomous mobile robot and a position of the tangent vector.

According to various exemplary embodiments of the present invention, the travel path of the AMR from the starting point to the destination point via a waypoint is obtained in a curved line, time loss for turning direction at the waypoint may be removed and travel time may be decreased.

Furthermore, by variably setting a circular accuracy zone around the waypoint depending on existence of an obstacle around the way point, the smooth traveling of the autonomous mobile robot may be secured.

Furthermore, by defining effective range of the accuracy zone, excessively close approach of the AMR to the waypoint may be detected, and in the instant case the AMR may be directed toward the destination point without further approaching to the waypoint.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Furthermore, unless explicitly described to the contrary, the word "comprise" and variations such as "comprises" or "comprising", will be understood to imply the inclusion of stated elements but not the exclusion of any other elements. Furthermore, the terms "-er", "-or", and "module" described in the specification mean units for processing at least one function and operation, and may be implemented by hardware components or software components, and combinations thereof.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and nature or order of the constituent elements is not limited by the term.

In the exemplary embodiment, it is to be understood that when one component is referred to as being "connected" or "coupled" to another component, it may be connected or directly coupled to the other component or be connected or coupled to the other component with a further component intervening therebetween. In the exemplary embodiment, it is to be understood that when one component is referred to as being "connected or coupled directly" to another component, it may be connected to or coupled to the other component without another component intervening therebetween.

The terms used herein are used only for describing exemplary embodiments and are not intended to limit the present invention. Singular expressions include plural expressions unless clearly referred to as different meanings in the context.

It will be further understood that terms "comprise" and "have" used in the exemplary embodiment specify the presence of stated features, numerals, steps, operations, components, parts, or combinations thereof, but do not preclude the presence or addition of one or more other features, numerals, steps, operations, components, parts, or combinations thereof.

Unless otherwise defined herein, all terms including technical or scientific terms used herein have the same meaning as commonly understood by one of ordinary skill in the art to which various exemplary embodiments of the present invention belongs. Terms such as those defined in a commonly used dictionary may be interpreted as being consistent with the meaning in the context of the related technology, and are not interpreted in an ideal or excessively formal meaning unless explicitly defined in the exemplary embodiment of the present invention.

Hereinafter, an autonomous mobile robot according to an exemplary embodiment utilizing an omni-directional waypoint and a control method thereof is described in detail with reference to the drawings.

Figure 1:
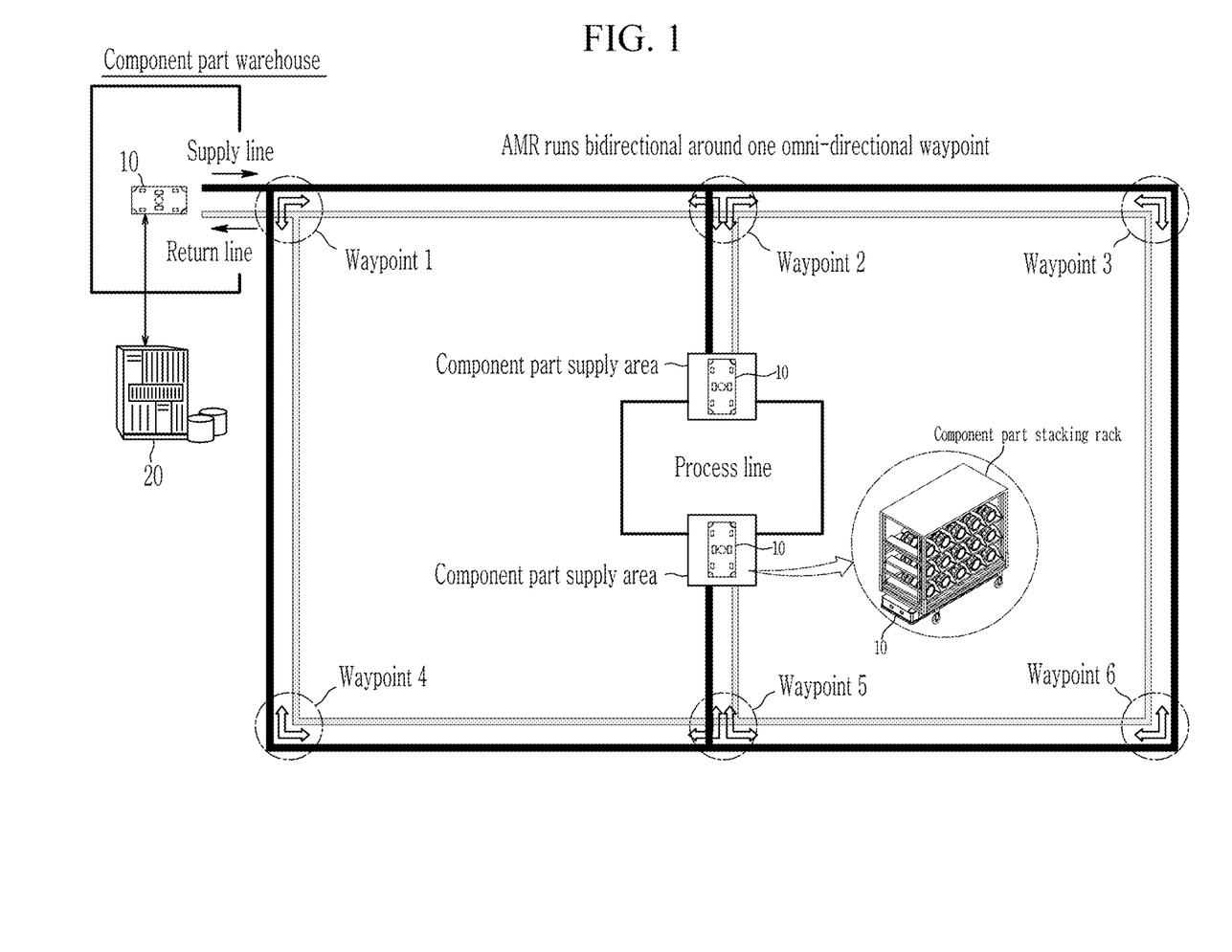
FIG. 1 shows an operation scheme of an autonomous mobile robot utilizing an omni-directional waypoint in a factory line according to various exemplary embodiments of the present invention.

FIG. 1 shows an operation scheme of an autonomous mobile robot utilizing an omni-directional waypoint in a factory line according to various exemplary embodiments of the present invention.

Referring to FIG. 1, a production line of a smart factory according to various exemplary embodiments of the present invention includes a component part warehouse, a process line that assembles component parts, and a plurality of autonomous mobile robots (AMRs) 10 that are operated for transport of the component parts. Furthermore, the production line may further include a central server 20 that centrally controls the transfer status of the component parts of the AMR 10 according to the factory's production plan and the work schedule of the process line.

The AMR 10 in the production line may be used for supply and return parts by use of component part stacking racks.

The AMR 10 supplies component parts by picking up the component parts from the component part warehouse according to the work instruction of the central server 20 and transferring them to the process line through one or more waypoints along the supply line. Thereafter, the AMR 10 returns to the component part warehouse through at least one waypoint along a return line.

The AMR 10 is configured for bidirectional driving according to the curved line of the travel path by setting an accuracy zone centering on the omni-directional waypoint, which is not fixed to be unidirectional.

Figure 2:
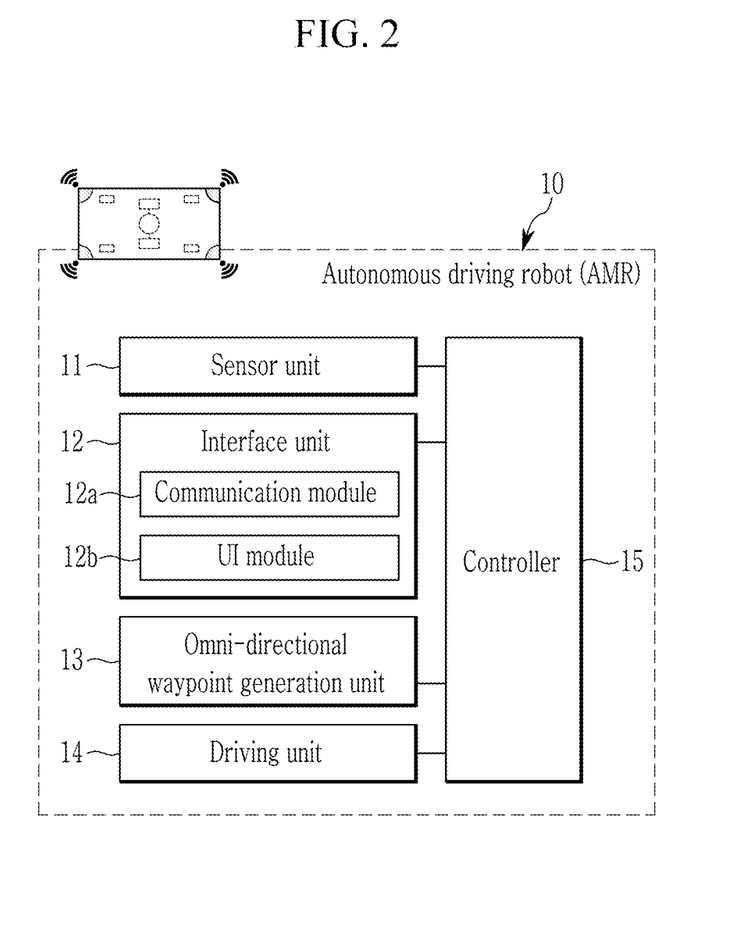
FIG. 2 is a block diagram schematically showing a configuration of an autonomous mobile robot according to various exemplary embodiments of the present invention.

FIG. 2 is a block diagram schematically showing a configuration of an autonomous mobile robot according to various exemplary embodiments of the present invention.

Figure 3:
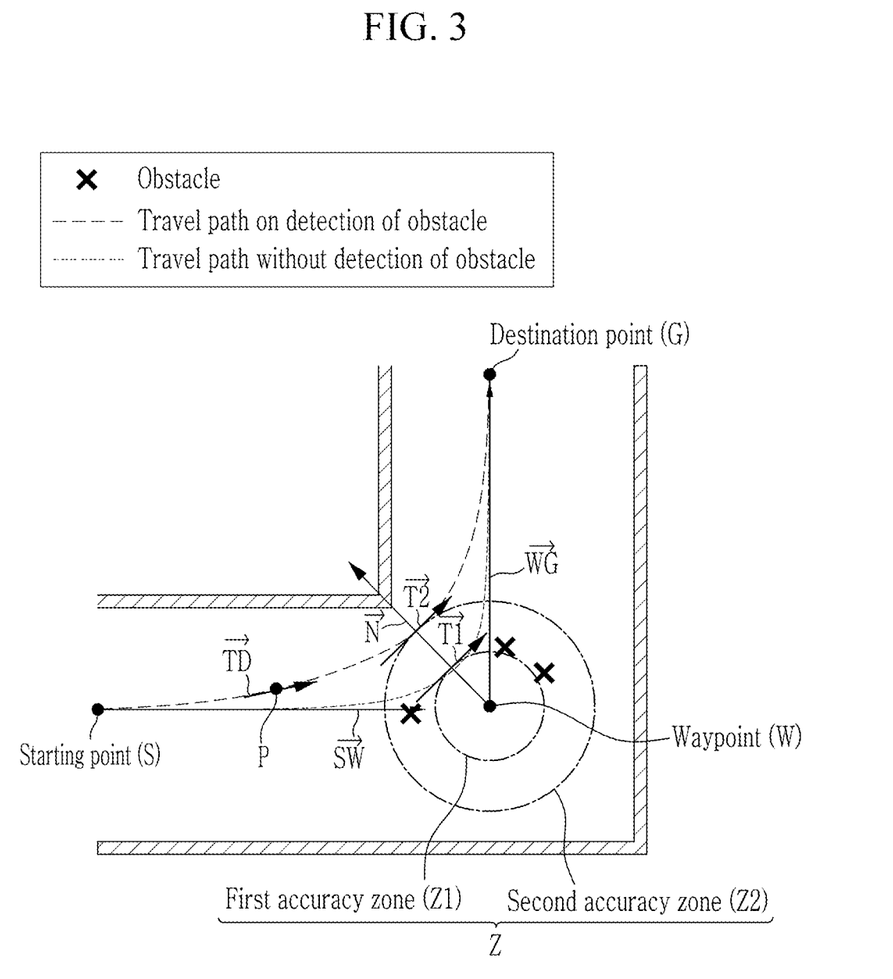
FIG. 3 shows a travel path using omni-directional waypoints according to various exemplary embodiments of the present invention.

FIG. 3 shows a travel path using omni-directional waypoints according to various exemplary embodiments of the present invention.

Referring to FIG. 2 and FIG. 3, the AMR 10 according to various exemplary embodiments of the present invention includes a sensor unit 11, an interface unit 12, an omni-directional waypoint generation unit 13, a driving unit 14, and a controller 15.

The sensor unit 11 detects obstacles in the travel path by monitors the surroundings. The obstacle may be a fixed or moving obstacle, for example, an object, a person, another AMR 10, and the like.

The sensor unit 11 includes at least one of a laser, a camera, a Light Detection and Ranging (LiDAR), and a high precision DGPS.

The interface unit 12 includes a communication module 12a configured to communicate data with the central server 20 and surrounding process equipment, and a user interface (UI) module configured to set a travel condition upon receiving an input of the central server or a worker.

For example, the communication module 12a may communicate with a programmable logic controller (PLC) to collect status data thereof, such as status data of the process equipment, and to transmit the status data of the AMR 10.

The interface unit 12, the communication module 12a or the UI module 12b, may set a starting point S, a waypoint W, a destination point G, and an accuracy zone Z of a circular area around the waypoint W for traveling of the AMR 10, according to work instruction of the central server 20 or the worker's input.

The controller 15 controls the AMR 10, when the AMR 10 enters an effective range of the accuracy zone Z while traveling to the waypoint W according to a travel path, to directly move toward the destination point G without further moving to the waypoint W. The controller 15 is configured to control the driving unit 14 to move the AMR 10 along the travel path toward the waypoint W, and when the travel direction vector toward the waypoint enters an effective range of the accuracy zone, to move the autonomous mobile robot toward the destination point without further moving toward the waypoint.

The interface unit 12 may variably set the circle size of the accuracy zone Z, in consideration of position, speed, and available travel path curvature for the AMR 10 to travel around the waypoint W. For example, the interface unit 12 may set the accuracy zone Z to be relatively large when the AMR 10 is far apart from the waypoint W, and the interface unit 12 may set the accuracy zone Z to be relatively small when the AMR 10 is close to the waypoint W. For another example, the interface unit 12 may set the accuracy zone Z to be relatively large when the AMR 10 is running fast, and the interface unit 12 may set the accuracy zone Z to be relatively small when the AMR 10 is running slow. For yet another example, when the AMR 10 becomes heavier, e.g., by being loaded with parts, the travel path curvature of the AMR 10 may be small, i.e., the travel path may be smooth to avoid sharp turn. Thus, the interface unit 12 may set the accuracy zone Z to be relatively large or small depending on the available travel path curvature of AMR 10.

It may also be understood that when the accuracy zone Z is varied, the travel path based on the accuracy zone Z may also be varied.

Furthermore, during the traveling of the AMR 10, the interface unit 12 may vary the circle size of the accuracy zone Z.

Referring to FIG. 3, when the AMR 10 starts traveling, the interface unit 12 may set an initial accuracy zone Z as a first accuracy zone Z1 having a smaller size (i.e., radius) when the obstacle is not found around the waypoint W. Accordingly, when an obstacle (refer to the symbol X in FIG. 3) is found around the waypoint W during the traveling of the AMR 10, the interface unit 12 may vary the initial accuracy zone Z1 to an adjusted accuracy zone of a second accuracy zone Z2 having a larger size, to enable the AMR 10 to avoid the obstacle. When the obstacle is detected around the waypoint W, the interface unit is configured to increase a size of the circular area by an increment (e.g., the radius difference between the accuracy zones Z1 and Z2) that enables the autonomous mobile robot to avoid the obstacle, in consideration of a size or location of the obstacle positioned around the waypoint.

For example, the interface unit 12 may increase the circle size of the accuracy zone Z by a small amount when a small obstacle is positioned close to the waypoint W, and may increase the circle size of the accuracy zone Z by a large amount when a large obstacle is positioned slightly apart from the waypoint W.

It may be understood that, to the contrary, the interface unit 12 may initially set the initial accuracy zone as the second accuracy zone Z2 when the obstacle is found around the waypoint W, and then vary the accuracy zone Z to the first accuracy zone Z1 when the obstacle is removed during the traveling of the AMR 10.

When the accuracy zone Z is set initially or varied during the traveling of the AMR 10, the omni-directional waypoint generation unit 13 is configured to obtain the travel path in a curved line which is aligned to tangentially meet a tangent vector of the circular area of the accuracy zone Z. For example, referring to FIG. 3, when the accuracy zone Z is initially set to be the first accuracy zone Z1, the travel path of the AMR 10 may be initially obtained as the dotted line that tangentially meets the circle of the first accuracy zone Z1. Accordingly, when obstacles are found around the waypoint W during the traveling of the AMR 10, the omni-directional waypoint generation unit 13 adjusts the accuracy zone Z to the second accuracy zone Z2 having a larger radius, and recalculates the travel path to be the dashed line that tangentially meets the adjusted (enlarged) circle of the second accuracy zone Z2.

The travel path in a curved line may be obtained as follows.

When a position of the waypoint W is denoted as (a, b), the circle (x, y) for the accuracy zone Z may be expressed as the following equation 1.

$$(x-a)^2 + (y-b)^2 = r^2 \quad \text{(Equation 1)}$$

Referring to FIG. 3, a vector $\vec{SW}$ denotes a vector from the starting point S to the waypoint W, a vector $\vec{WG}$ denotes a vector from the waypoint W to a destination point G, and a vector $\vec{TD}$ denotes a travel direction vector at an instantaneous position P, which is an instantaneous tangent vector along the travel path.

Conventionally, the AMR 10 is driven to linearly move along the vector $\vec{SW}$ from the starting point S to reach the waypoint W, and then turn its travel direction to then move toward the destination point G along the vector $\vec{WG}$. However, in the exemplary embodiment of the present invention, the AMR 10 establishes the travel path to tangentially meet a tangent vector $\vec{T}$ of the circle of the accuracy zone Z, which is such that the travel path may tangentially meet the circle of the accuracy zone Z, that is, the travel direction vector $\vec{TD}$ may meet while the AMR 10 travels along the travel path.

The omni-directional waypoint generation unit 13 obtains the tangent vector $\vec{T}$ of the accuracy zone Z, that is, a first tangent vector $\vec{T1}$ of the first accuracy zone Z1 when the obstacle exists around the waypoint W, or a second tangent vector $\vec{T2}$ of the second accuracy zone Z2 when the obstacle does not exist around the waypoint W. For example, the omni-directional waypoint generation unit 13 may determine a normal vector $\vec{N}$ which is symmetrically between the lines of the vector $\vec{SW}$ and the vector $\vec{WG}$, and then the tangent vector $\vec{T}$ may be obtained to be perpendicular to the normal vector $\vec{N}$.

In a mathematical sense, a vector only includes components of direction and magnitude, but in the sense of the exemplary embodiment of the present invention, the tangent vector $\vec{T}$ (e.g., $\vec{T1}$ and $\vec{T2}$) also includes the component of position, thorough which the travel path of the AMR 10 will pass. The position of the tangent vector $\vec{T}$ may be obtained based on the size (i.e., radius) of the circular region of the accuracy zone Z. Thus, at the position of the tangent vector $\vec{T}$, the travel direction vector $\vec{TD}$ of the travel path coincides the tangent vector $\vec{T}$.

When the tangent vector $\vec{T}$ of the accuracy zone Z is identified, the travel path in a curved line may be obtained, for example, by an arc that meets the tangent vector $\vec{T}$ and the lines of the vectors $\vec{SW}$ and $\vec{WG}$.

By the above configuration, the AMR 10 may move along the travel path in a smooth curved line from the starting ping S to the destination point G via the waypoint W. Here, the term "via" does not mean that the AMR 10 exactly passes through the waypoint W but passes by the waypoint W.

It has been explained that the travel path may be varied depending on whether the obstacle is found around the waypoint W, at the time of initially setting the accuracy zone Z or during the traveling of the AMR 10. In the instant case, the travel path may be needed to be varied to a new travel path, e.g., from the dotted line to the dashed line in FIG. 3, and the current position of AMR 10 may not be on the new travel path, e.g., too close to the waypoint W.

There may be other cases that the AMR 10 cannot precisely follow the preset travel path, for example, in the case of perturbation of actual travelling due to road irregularities, short term communication failure to find the current position of the AMR 10, and the like.

In such a case, the AMR 10 cannot follow the new travel path, and the travel plan toward the destination point G need to be adjusted.

Figure 5:
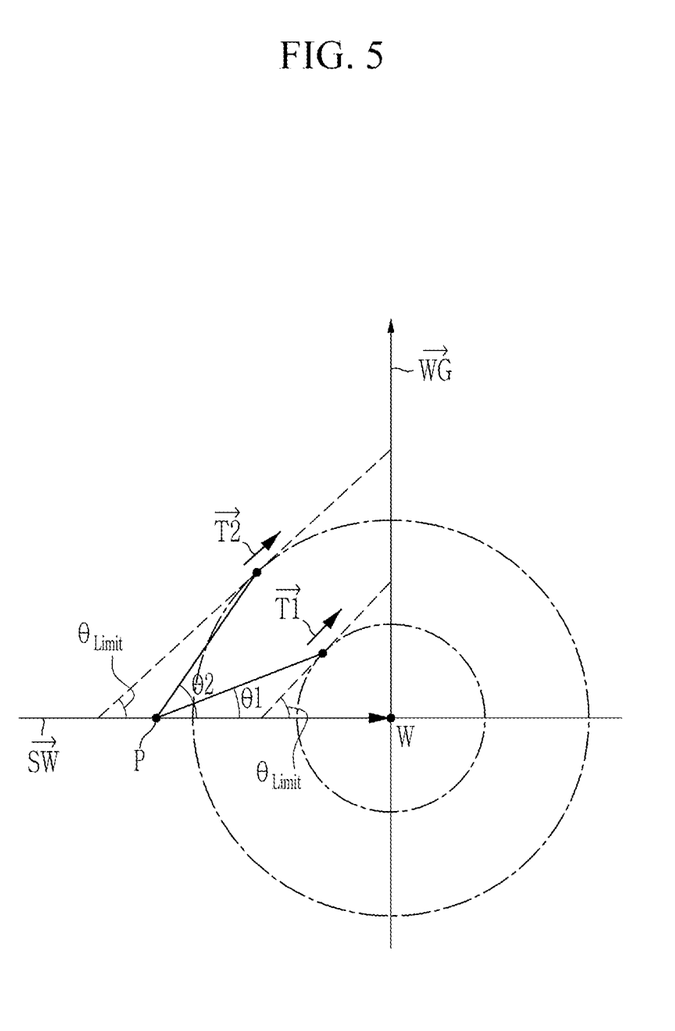
FIG. 5 shows a determination method of a tangent angle θ of the current position of the autonomous mobile robot according to various exemplary embodiments of the present invention.

Referring to FIG. 5, the omni-directional waypoint generation unit 13 may determine a tangent angle θ (θ1 and θ2 in FIG. 5) that indicates how close the current position P of the AMR 10 is to the waypoint W. The tangent angle θ may be determined as, for example, an angle between the vector $\vec{SW}$ and an imaginary line connecting the current position P and the tangent vector $\vec{T}$ as illustrated in FIG. 5, or for another example, an angle between the vector $\vec{SW}$ and the tangential line of the accuracy zone Z that passes through the current position P.

When the accuracy zone is varied from the smaller first accuracy zone Z1 to the larger second accuracy zone Z2, the tangent angle θ, which is newly determined, varies from θ1 to θ2.

An effective range of the accuracy zone Z is set as a range where the tangent angle θ is smaller than a reference angle $θ_{Limit}$. Since the radius of the second accuracy zone Z2 is greater than the radius of the first accuracy zone Z1, the effective range is larger in the second accuracy zone Z2 than in the first accuracy zone Z1.

For the illustrated example of FIG. 5, the effective range of the first accuracy zone Z1 may be a triangular region formed by the lines of the vectors $\vec{SW}$, $\vec{WG}$, and $\vec{T1}$, and the effective range of the second accuracy zone Z2 may be a triangular region formed by the lines of the vectors $\vec{SW}$, $\vec{WG}$, and $\vec{T2}$.

Let us suppose that the current position P of the AMR 10 is within the effective range of the second accuracy zone Z2 and outside the effective range of the first accuracy zone Z1, and the accuracy zone is changed from the first accuracy zone Z1 to the second accuracy zone Z1. In the instant case, while the AMR 10 is moving toward the waypoint W with the tangent angle θ1 smaller than $θ_{Limit}$, the newly determined tangent angle θ2 with respect to the second accuracy zone Z2 becomes greater than the reference angle $θ_{Limit}$.

Therefore, when the accuracy zone varies from the first accuracy zone Z1 to the second accuracy zone Z2, for example, due to existence of the obstacle around the waypoint, it may be determined that the position of the AMR 10 is within the effective range of the second accuracy zone Z2.

In the instant case, the controller is configured to drive the AMR 10 toward the destination point G without further moving toward the waypoint W.

The change of the travel path of the AMR 10 may be implemented in various ways. For example, when the tangent angle θ becomes greater than the reference angle $θ_{Limit}$, the AMR 10 may be driven directly to the position of the second tangent vector $\vec{T2}$, and then driven to follow the travel path passing through the second tangent vector $\vec{T2}$.

Therefore, the AMR 10 may smoothly travel from the starting point S to the destination point G via the waypoint W, regardless of whether the obstacle exists around the waypoint W or whether the existence of the obstacle is changed during the travelling of the AMR 10.

In the above description, the supply process of the AMR 10 from the starting point S to the destination point G via the waypoint W is described in detail. However, it may be understood that the above description may be applied to the return process of the AMR 10, by interchanging the starting point S and the destination point G.

The driving unit 14 is configured to generate a driving torque for driving the AMR 10 by driving a motor according to a driving instruction generated based on the travel path and received from the controller 15. By the driving torque generated by the driving unit 14, the AMR 10 may travel, i.e., move and change a traveling direction thereof.

The driving unit 14 may include, depending on required functions and specifications of the AMR 10, a lifting apparatus, a forklift apparatus, a carriage towing apparatus, and the like.

The controller 15 may include a memory configured to store various program, data, and the like used for the control of the AMR 10 according to an exemplary embodiment utilizing an omni-directional waypoint, and a processor configured to execute the program for controlling the functions of the controller 15.

In the above description, the omni-directional waypoint generation unit 13 has been referred to as a separate device from the controller 15. However, this is merely for better understanding and it may be understood that the omni-directional waypoint generation unit 13 may be integrated into the controller 15, and in the instant case, functions of the integrated controller excluding the functions of the omni-directional waypoint generation unit 13 may correspond to the functions of the controller 15. Thus, depending on implementations, the functions of the omni-directional waypoint generation unit 13 may be understood to be performed by the controller 15.

In brief, a travel path of the AMR 10 from the starting point S to the destination point G via at least one the waypoint W is initially generated by the work instruction of the central server 20 or by a worker's input. The travel path may include the supply path for delivering component parts and the return line for returning the AMR 10.

The supply path and/or the return path is obtained as an initial path in a curved line that tangentially meet the circle of the initial accuracy zone (e.g., Z1) having an initial size, and the controller 15 drives the driving unit 14 to move the AMR 10 along the initial path.

Accordingly, when the obstacle around the waypoint W is detected while traveling of the AMR 10, the accuracy zone is adjusted to an adjusted accuracy zone (e.g., Z2) having an adjusted size. In the instant case, the travel path is also adjusted, and the controller 15 drives the driving unit 14 to move the AMR along the adjusted travel path. Therefore, even if existence of the obstacle is changed during traveling of the AMR 10, the AMR 10 may avoid the obstacle.

Furthermore, by checking whether the AMR 10 enters the effective range of the accuracy zone while traveling along the travel path, the AMR 10 may smoothly travel from the starting point S to the destination point G via the waypoint W.

Figure 4:
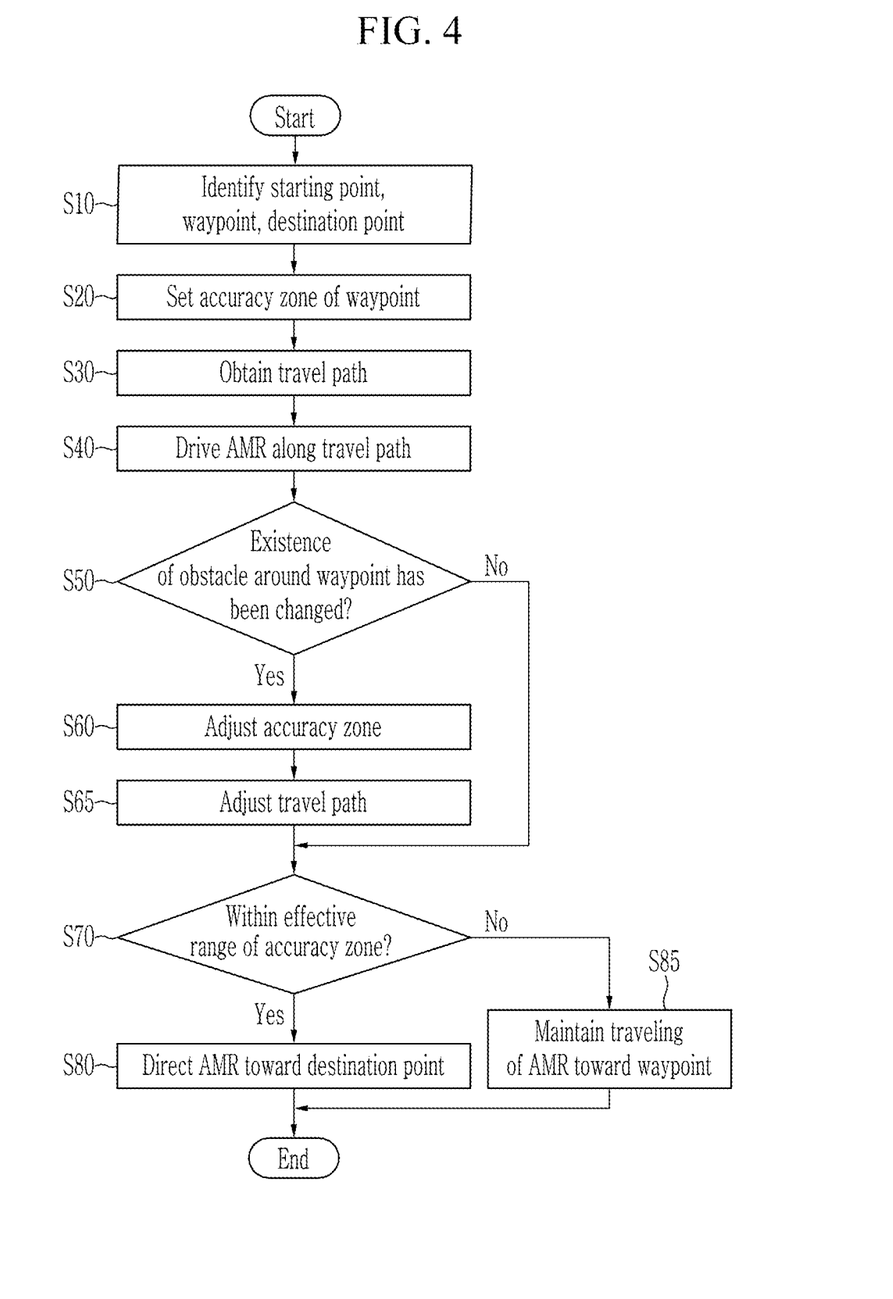
FIG. 4 is a flowchart schematically showing an autonomous mobile robot utilizing an omni-directional waypoint control method according to various exemplary embodiments of the present invention.

FIG. 4 is a flowchart schematically showing an autonomous mobile robot utilizing an omni-directional waypoint control method according to various exemplary embodiments of the present invention.

Referring to FIG. 4, firstly at step S10, coordinates of a starting point, a waypoint, and a destination point are identified, for example, through the interface module 12 by the work instruction of the central server 20 or by a worker's input.

Subsequently at step S20, an accuracy zone Z having a circular area around the waypoint W is set, for example, by the omni-directional waypoint generation unit 13. As described above, the accuracy zone Z may be initially set to the first accuracy zone Z1 or the second accuracy zone Z2 depending on existence of the obstacle around the waypoint W. As described above, in the setting of the accuracy zone, the tangent vector $\vec{T}$ of the boundary of the accuracy zone Z is determined.

Then at step S30, the travel path of the AMR 10 is obtained in the curved line which is aligned to tangentially meet the circular area of the accuracy zone Z. As described above, in the obtaining of the travel path, the travel path may be obtained in the curved line such that the travel direction vector $\vec{TD}$ on the travel path may coincide the tangent vector $\vec{T}$.

Then at step S40, the AMR 10 is driving along the travel path by the controller 15 by driving the driving unit 14.

At step S50, the controller 15 determines whether existence of the obstacle around the waypoint is changed, that is, whether the obstacle is newly detected or whether the obstacle that was initially detected is removed.

When the existence of the obstacle around the waypoint is changed (S50—Yes), the accuracy zone Z is adjusted to an adjusted accuracy zone having an adjusted size at step S60. At the step S60, referring to FIG. 3, the accuracy zone Z may be adjusted, for example, from the first accuracy zone Z1 to the second accuracy zone Z2 when the obstacle is newly detected, or from the second accuracy zone Z2 to the first accuracy zone Z1 when the obstacle which is initially detected is removed.

After adjusting the accuracy zone Z, the travel path is also adjusted, at step S65, to an adjusted travel path according to the adjustment of the accuracy zone to the adjusted accuracy zone.

For example, referring to FIG. 3, when the accuracy zone Z is adjusted from the first accuracy zone Z1 to the second accuracy zone Z2, the travel path may be adjusted from the dotted line to the dashed line. When the accuracy zone Z is adjusted from the second accuracy zone Z2 to the first accuracy zone Z1, the travel path may be adjusted from the dashed line to the dotted line.

At step S70, the controller 15 may determine whether the current position P of the AMR 10 is within the effective range of the accuracy zone Z. The accuracy zone Z may be the initial accuracy zone or the adjusted accuracy zone. As described above, referring to FIG. 5, it may be determined that the current position P is within the effective range of the accuracy zone Z when a tangent angle $\theta$ is greater than a reference angle $\theta_{Limit}$, where the tangent angle $\theta$ is determined as an angle between an imaginary line interconnecting the starting point S and the waypoint W and an imaginary line interconnecting the current position P of the AMR 10 and the position of the tangent vector $\vec{T}$.

When the current position P of the AMR 10 is within the effective range of the accuracy zone Z (S70—Yes), the controller 15 drives the AMR 10, at step S80, toward the destination point G without further moving toward the waypoint W.

When the current position P of the AMR 10 is not within the effective range of the accuracy zone Z (S70—No), the controller 15 maintains to drive the AMR 10 toward the waypoint W along the travel path, at step S85.

According to various exemplary embodiments of the present invention, the travel path of the AMR from the starting point to the destination point via a waypoint is obtained in a curved line, time loss for turning direction at the waypoint may be removed and travel time may be decreased.

Furthermore, by variably setting a circular accuracy zone around the waypoint depending on existence of an obstacle around the way point, the smooth traveling of the autonomous mobile robot may be secured.

Furthermore, by defining effective range of the accuracy zone, excessively close approach of the AMR to the waypoint may be detected, and in the instant case the AMR may be directed toward the destination point without further approaching to the waypoint.

The exemplary embodiments of the present invention described above are not only implemented by the apparatus and the method, but may be implemented by a program for realizing functions corresponding to the configuration of the exemplary embodiments of the present invention or a recording medium on which the program is recorded.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An autonomous mobile robot for transferring a component part in a process line of a production factory, the autonomous mobile robot comprising:
    an interface unit configured to identify coordinates of a waypoint and a destination point in a travel path, and to set an accuracy zone having a circular area around the waypoint when a first travel direction vector directed to the waypoint does not coincide a second travel direction vector directed from the waypoint to the destination point;
    an omni-directional waypoint generation unit configured to obtain the travel path in a curved line which is aligned to meet the first travel direction vector and the second travel direction vector and to tangentially meet a tangent vector tangential to a boundary of the circular area between the first and second travel direction vectors;
    a driving unit configured to generate a driving torque of the autonomous mobile robot for driving the autonomous mobile robot; and
    a controller electrically connected to the interface unit, the omni-directional waypoint generation unit and the driving unit and configured to control the driving unit to move the autonomous mobile robot along the travel path toward the waypoint, and to move the autonomous mobile robot toward the destination point without further moving toward the waypoint.

2. The autonomous mobile robot of claim 1, wherein the interface unit includes:
    a communication module configured to communicate data with surrounding process equipment and a central server configured for instructing the autonomous mobile robot; and
    a user interface module configured to set a travel condition upon receiving an input of the central server or a worker.

3. The autonomous mobile robot of claim 2, wherein the interface unit is configured to adjust a circle size of the accuracy zone according to a speed of the autonomous mobile robot and an available travel path curvature of the autonomous mobile robot.

4. The autonomous mobile robot of claim 3, further comprising a sensor unit configured to detect an obstacle in the travel path of the autonomous mobile robot by monitoring surroundings of the autonomous mobile robot,
    wherein the interface unit is configured to set an initial accuracy zone having an initial size and vary the initial accuracy zone to an adjusted accuracy zone having an adjusted size depending on whether existence of the obstacle around the waypoint is changed.

5. The autonomous mobile robot of claim 4, wherein, when the controller determines that the obstacle is detected around the waypoint by the sensor unit, the interface unit is configured to increase a size of the circular area by an increment that enables the autonomous mobile robot to avoid the obstacle, in consideration of a size or location of the obstacle positioned around the waypoint.

6. The autonomous mobile robot of claim 1, wherein the omni-directional waypoint generation unit is configured to determine the tangent vector of the boundary of the accuracy zone where the controller determines that the travel path in the curved line coincides the tangent vector.

7. The autonomous mobile robot of claim 6, wherein the omni-directional waypoint generation unit is configured to determine a normal vector of the boundary of the accuracy zone to determine a position of the normal vector.

8. The autonomous mobile robot of claim 7, wherein then the tangent vector is perpendicular to the normal vector.

9. The autonomous mobile robot of claim 6, wherein the omni-directional waypoint generation unit is configured to determine a tangent angle that indicates how close the current position of the autonomous mobile robot is to the waypoint.

10. The autonomous mobile robot of claim 9, wherein the omni-directional waypoint generation unit is configured to determine, as the tangent angle, an angle between a vector from the starting point to the waypoint and the tangent vector.

11. The autonomous mobile robot of claim 9, wherein the controller is configured to move the autonomous mobile robot toward the destination point without further moving toward the waypoint when the controller determines that the tangent angle is greater than a reference angle.

12. The autonomous mobile robot of claim 11, wherein the controller is configured to drive the autonomous mobile robot based on an initial accuracy zone having an initial size and drive the autonomous mobile robot based on an adjusted accuracy zone having an adjusted size depending on detection of the obstacle at the waypoint while traveling of the autonomous mobile robot.

13. A method of controlling an autonomous mobile robot, the method including:
    identifying, by a controller, coordinates of a starting point, a waypoint, and a destination point;
    setting, by the controller, an accuracy zone having a circular area around the waypoint;
    determining, by the controller, a travel path of the autonomous mobile robot in a curved line which is aligned to tangentially meet a boundary of the circular area when a first travel direction vector directed to the waypoint does not coincide a second travel direction vector directed from the waypoint to the destination point; and
    driving, by the controller, the autonomous mobile robot along the travel path.

14. The method of claim 13, further including:
    adjusting, by the controller, the accuracy zone to an adjusted accuracy zone having an adjusted size depending on whether existence of an obstacle around the waypoint is changed; and
    adjusting, by the controller, the travel path to an adjusted travel path according to the adjustment of the accuracy zone to the adjusted accuracy zone.

15. The method of claim 14, wherein, when the controller determines that the obstacle is detected around the waypoint, increasing a size of the circular area by an increment that enables the autonomous mobile robot to avoid the obstacle, in consideration of a size or location of the obstacle positioned around the waypoint.

16. The method of claim 13, further including:
    determining, by the controller, whether a current position of the autonomous mobile robot is within an effective range of the accuracy zone; and driving, by the controller, the autonomous mobile robot toward the destination point without further moving toward the waypoint when the controller determines that the current position of the autonomous mobile robot is within the effective range of the accuracy zone.

17. The method of claim 16,
wherein in the setting of the accuracy zone, a tangent vector of the boundary of the accuracy zone is determined, and
wherein in the obtaining of the travel path, the travel path is obtained in the curved line so that the travel path coincides the tangent vector.

18. The method of claim 16,
wherein in the determining whether a current position of the autonomous mobile robot is within the effective range of the accuracy zone, the controller is configured to determine that the current position is within the effective range of the accuracy zone when the controller concludes that a tangent angle is greater than a reference angle, and
wherein the tangent angle is an angle between an imaginary line interconnecting the starting point and the waypoint and an imaginary line interconnecting the current position of the autonomous mobile robot and a position of the tangent vector to which the boundary is tangentially met.

19. A non-transitory computer readable storage medium on which a program for performing the method of claim 13 is recorded.

* * * * *